United States Patent
McCrady et al.

(10) Patent No.: US 6,453,168 B1
(45) Date of Patent: Sep. 17, 2002

(54) METHOD AND APPARATUS FOR DETERMINING THE POSITION OF A MOBILE COMMUNICATION DEVICE USING LOW ACCURACY CLOCKS

(75) Inventors: Dennis D. McCrady, Holmdel; Lawrence J. Doyle, Hazlet; Howard Forstrom, Fairlawn, all of NJ (US)

(73) Assignee: ITT Manufacturing Enterprises, Inc, Wilmington, DE (US)

( * ) Notice: Subject to any disclaimer, the term of this patent is extended or adjusted under 35 U.S.C. 154(b) by 0 days.

(21) Appl. No.: 09/365,702

(22) Filed: Aug. 2, 1999

(51) Int. Cl.⁷ .................................................. H04B 7/00
(52) U.S. Cl. ..................... 455/517; 455/506; 455/65; 455/277.2; 455/456; 342/457; 375/347
(58) Field of Search ................................ 455/456, 457, 455/422, 517, 466, 67.1, 65, 59, 504, 506, 133–5, 277.1, 277.2; 342/457, 463, 357.06; 375/138, 347

(56) References Cited

U.S. PATENT DOCUMENTS

| | | | |
|---|---|---|---|
| 4,665,404 A | * 5/1987 | Christy et al. ............... | 342/463 |
| 5,109,390 A | * 4/1992 | Gilhousen et al. ....... | 455/506 X |
| RE34,004 E | 7/1992 | Rogoff et al. | |
| 5,293,642 A | 3/1994 | Lo | |
| 5,579,321 A | 11/1996 | Van Grinsven et al. | |
| 5,663,990 A | * 9/1997 | Bolgiano et al. ............ | 375/138 |
| 5,774,876 A | * 6/1998 | Woolley et al. ....... | 340/572.1 X |
| 5,912,644 A | * 6/1999 | Wang ......................... | 342/457 |
| 5,982,324 A | * 11/1999 | Watters et al. .......... | 342/357.06 |

OTHER PUBLICATIONS

Robert A. Scholtz, The Origins of Spread–Spectrum Communications, IEEE Transactions on Communications, May 1982, pp. 822–854, vol. Com. 30, No. 5, University of Southern California, Los Angeles, CA.

Benjamin B. Peterson, et al., Spread Spectrum Indoor Geolocation, Journal of the Institute of Navigation, Summer 1998, vol. 45, No. 2, New London, Connecticut.

* cited by examiner

Primary Examiner—William Trost
Assistant Examiner—Philip J. Sobutka

(57) ABSTRACT

A spread spectrum position location communication system determines the position of a mobile master radio using a round-trip messaging scheme in which the time of arrive (TOA) of ranging messages is accurately determined to yield the range estimates required to calculate the position of the mobile radio via trilateration. The master radio transmits outbound ranging messages to plural reference radios which respond by transmitting reply ranging messages. Upon reception of the reply ranging message, the master radio determines the range to the reference radio from the signal propagation time calculated by subtracting the far-end turn around time from the round-trip elapsed time. Any combination of fixed or mobile radios of known positions can be used as the reference radios for another mobile radio in the system, thereby providing adaptability under varying transmission conditions. The individual radios do not need to be synchronized to a common time reference, thereby eliminating the need for highly accurate system clocks. By performing internal delay calibration, errors caused by difficult-to-predict internal transmitter and receiver delay variations can be minimized. Leading-edge-of-the-signal curve fitting and frequency diversity techniques minimize the effects of multipath interference on TOA estimates.

18 Claims, 6 Drawing Sheets

MODIFIED CSMA-CA PROTOCOL FOR RANGING

METHOD AND APPARATUS FOR DETERMINING THE POSITION OF A MOBILE COMMUNICATION DEVICE USING LOW ACCURACY CLOCKS

BACKGROUND OF THE INVENTION

1. Field of the Invention

The present invention relates to a position location system for determining the position of a mobile communication device, and, more particularly, to a system employing two-way transmission of spread spectrum ranging signals between the mobile communication device and reference communication devices having relatively low accuracy clocks, to rapidly and accurately determine the position of the mobile communication device in the presence of severe multipath interference.

2. Description of the Related Art

The capability to rapidly and accurately determine the physical location of a mobile communication device would be of great benefit in a variety of applications. In a military context, it is desirable to know the location of military personnel and/or equipment during coordination of field operations and rescue missions, including scenarios where signals of conventional position-determining systems, such as global position system (GPS) signals, may not be available (e.g., within a building). More generally, appropriately equipped mobile communication devices could be used to track the position of personnel and resources located both indoors or outdoors, including but not limited to: police engaged in tactical operations; firefighters located near or within a burning building; medical personnel and equipment in a medical facility or en route to an emergency scene, including doctors, nurses, paramedics and ambulances; and personnel involved in search and rescue operations. An integrated position location communication device would also allow high-value items to be tracked and located, including such items as personal computers, laptop computers, portable electronic devices, luggage, briefcases, valuable inventory, and stolen automobiles. In urban environments, where conventional position determining systems have more difficulty operating, it would be desirable to reliably track fleets of commercial or industrial vehicles, including trucks, buses and rental vehicles. Tracking of people carrying a mobile communication device is also desirable in a number of contexts, including, but not limited to: children in a crowded environment such as a mall, amusement park or tourist attraction; location of personnel within a building; and location of prisoners in a detention facility.

The capability to determine the position of a mobile communication device also has application in locating the position of cellular telephones. Unlike conventional land-based/wire-connected telephones, the location of conventional cellular telephones cannot automatically be determined by emergency response systems (e.g., the 911 system in the United States) when an emergency call is placed. Thus, assistance cannot be provided if the caller is unable to speak to communicate his or her location (e.g., when the caller is unconscious, choking or detained against will). The capability to determine the position of cellular telephones could be used to pinpoint the location from which an emergency call has been made. Such information could also be used to assist in cell network management.

Naturally, in cases where a mobile communication device is being used primarily to transmit or receive voice or data information, it would be desirable to incorporate position location capabilities such that the device can communicate and establish position location at the same time without disruption of the voice or data communication.

Among convention techniques employed to determine the position of a mobile communication device is the reception at the mobile communication device of multiple timing signals respectively transmitted from multiple transmitters at different, known locations (e.g., global positioning system (GPS) satellites or ground-based transmitters). By determining the range to each transmitter from the arrival time of the timing signals, the mobile communication device can compute its position using triangulation.

The accuracy and operability of such position location techniques can be severely degraded in the presence of multipath interference caused by a signal traveling from a transmitter to the receiver along plural different paths, including a direct path and multiple, longer paths over which the signal is reflected off objects or other signal-reflective media. Unfortunately, multipath interference can be most severe in some of the very environments in which position location techniques would have their greatest usefulness, such as in urban environments and/or inside buildings, since artificial structures create opportunities for signals to be reflected, thereby causing signals to arrive at the receiver via a number of different paths.

Attempts have been made in position location systems to mitigate the effects of multipath interference. An example of a system reported to provide position location in a multipath environment is presented by Peterson et al. in "Spread Spectrum Indoor Geolocation," Navigation: Journal of The Institute of Navigation, Vol. 45, No 2, Summer 1998, incorporated herein by reference in its entirety. In the system described therein (hereinafter referred to as the Peterson system), the transmitter of a mobile radio continuously transmits a modulated pseudorandom noise (PRN) sequence, with a carrier frequency of 258.5 MHz and a chipping rate of 23.5 MHz. The transmitter is battery powered and therefore can be easily transported inside a building. Four wideband antennas located on the roof of a test site receive the signal transmitted by the mobile radio. The signals are conveyed from the antennas to four corresponding receivers via low loss cable that extends from the roof to the receivers disposed in a central location. The receivers demodulate the signal transmitted by the mobile radio using an analog-to-digital (A/D) converter board disposed inside a host personal computer (PC), which samples the signal at 1.7 s intervals for 5.5 ms and processes the raw data to determine the Time of Arrival (TOA). The system uses two receiver computers, each with a dual channel A/D board inside. The output from the receiver boxes is fed into a dual channel A/D board on two host computers. Each of the host computers processes the signal on each channel of the A/D board to determine the TOA for each channel relative to a trigger common to both channels on the A/D board. The TOA algorithm is based on finding the leading edge of the cross correlation function of the PRN sequence that is available at the output of the correlator using frequency domain techniques. TOAs are transferred via wireless local area network to the RAM-drive of a third computer acting as the base computer. From the TOAs, the base computer calculates time differences (TDs) and determines the two-dimensional position of the transmitter. This position is then plotted in real time on a building overlay.

The Peterson system suffers from a number of shortcomings. The range between the target radio and each reference radio is determined by measuring the duration of time required for a signal to travel between the radios. This information can be determined from a one-way communication only if the target radio and the reference radios remain synchronized to the same time reference. That is, the transmitting radio establishes the time of transmission of the signal based on its local clock, and the receiving radio determines the time of arrival of the signal based on its local clock which must constantly be synchronized to the same time reference as the clock of the transmitter. The signal propagation duration can then be determined essentially by subtracting the time of transmission from the time of arrival.

Because the Peterson system uses this one-way measurement technique, the system requires synchronization between the clocks of the transmitter and the four receivers. Unfortunately, the precise time synchronization required to accurately measure the duration of the signal propagation cannot tolerate significant time drift of any local clocks over time. Consequently, all of the clocks of the system must be highly accurate (i.e., on the order of 0.03 parts per million (ppm)), thereby increasing the cost and complexity of the system.

The requirement in the Peterson system to keep the transmitter and receiver clocks synchronized has further implications on the accuracy of the position estimates made from the one-way ranging signals. Asynchronous events occur within each radio which cannot readily be characterized or predicted in advance. These events introduce errors in the radio with respect to knowledge of the actual time of transmission and time of arrival, thereby degrading the accuracy of the range and position estimates.

Developed to demonstrate the feasibility of indoor geolocation, Peterson's test system does not address a number of technical issues required to construct a commercially useful system. For example, the receiver antennas are fixedly mounted (immobile) and cabled to receivers in a remote location. Consequently, the system is not adaptable to varying transmission conditions and cannot adjust to or compensate for scenarios where the radio of interest cannot communication with one or more of the reference receivers. Signal processing and analysis are performed with standard-size personal computers and other bulky experimental equipment. The system uses a relatively low chipping rate and remains susceptible to multipath interference, impacting the accuracy and operability of the system. Further, the position of radio determined by the system is only a two-dimensional position (i.e., in a horizontal plane).

Accordingly, there remains a need for a commercially viable position location system capable of quickly and accurately determining the three-dimensional indoor or outdoor position of a compact mobile communication device in the presence of severe multipath interference for use in the aforementioned practical applications.

SUMMARY OF THE INVENTION

It is an object of the present invention to rapidly, reliably and accurately determine the three-dimensional position of a mobile communication device in a variety of environments, including urban areas and inside buildings where multipath interference can be great.

It is a further object of the present invention to provide a compact, handheld or portable mobile communication device having position location capabilities useful in a wide array of applications, including location and/or tracking of people and items such as: military personnel and equipment, emergency personnel and equipment, valuable items, vehicles, mobile telephones, children and prisoners.

It is another object of the present invention to minimize the effects of interference caused by multipath signal propagation in a position location system, thereby providing highly accurate three-dimensional position estimates even under severe multipath conditions.

It is yet another object of the present invention to reduce the cost of a position detection system by avoiding the need for synchronization to the same timing reference throughout the system, thereby eliminating the need for certain expensive components, such as highly accurate clocks.

It is a still further object of the present invention to use state-of-the-art spread spectrum chipping rates and bandwidths to reduce multipath interference and improve position measurement accuracy in a position location system.

Another object of the present invention is to separate multipath interference from direct path signals to accurately determine the time of arrival of the direct path signal to accurately determine range.

Yet another object of the present invention is to minimize errors caused by processing delays that are difficult to characterize or accurately predict.

Still another object of the present invention is to provide a self-healing system, wherein a mobile communication device can adaptively rely on any combination of fixed radios and other mobile radios to determine its own position under varying communication conditions.

A further object of the present invention is to minimize design and manufacturing costs of a position-locating mobile communication device by using much of the existing hardware and software capability of a conventional mobile communication device.

A still further object of the present invention is to incorporate position location capabilities into a mobile communication device being used to transmit or receive voice or data information, such that the device can communicate and establish its position at the same time without disruption of the voice or data communication.

The aforesaid objects are achieved individually and in combination, and it is not intended that the present invention be construed as requiring two or more of the objects to be combined unless expressly required by the claims attached hereto.

In accordance with the present invention, a position location communication system provides accurate, reliable three-dimensional position location of a handheld or portable, spread spectrum communication device within milliseconds without interruption of voice or data communications. Using spread spectrum waveforms and processing techniques, the system of the present invention is capable of determining position location to an accuracy of less than one meter in a severe multipath environment.

More particularly, the system of the present invention employs a two-way, round-trip ranging message scheme in which the time of arrive of the ranging messages is accurately determined to yield accurate range estimates used to calculate the position of a mobile radio via trilateration. A master or target mobile radio transmits outbound ranging messages to plural reference radios which respond by transmitting reply ranging messages that indicate the location of the reference radio and the message turn around time (i.e., the time between reception of the outbound ranging message and transmission of the reply ranging message). Upon reception of the reply ranging message, the master radio determines the signal propagation time, and hence range, by subtracting the turn around time and internal processing delays from the elapsed time between transmission of the outbound ranging message and the time of arrival of the reply message. In this manner, the individual radios do not need to be synchronized to a common time reference, thereby eliminating the need for highly accurate system clocks required in conventional time-synchronized systems. The brief ranging messages can be interleaved with voice and data messages in a non-intrusive manner to provide position detection capabilities without disruption of voice and data communications.

To provide high accuracy range estimates, the time of arrival of the ranging messages are precisely estimated. By performing internal delay calibration, errors caused by difficult-to-predict internal transmitter and receiver delay variations can be minimized. The system uses state-of-the-art spread spectrum chipping rates and bandwidths to reduce multipath interference, taking advantage of existing hardware and software to carrying out a portion of the TOA estimation processing. Leading edge curve fitting is used to accurately locate the leading-edge of an acquisition sequence in the ranging message in order to further reduce effect of multipath interference on TOA estimates. The severity of multipath interference is determined by evaluating the pulse width of the acquisition sequence. If necessitated by severe multipath, frequency diversity is used to orthogonalize multipath interference with respect to the direct path signal, wherein an optimal carrier frequency is identified and used to estimate the TOA to minimize the impact of multipath interference.

Further, the system of the present invention is self-healing. Unlike conventional systems which require communication with a certain set of fixed-location reference radios, the system of the present invention can use a set of reference radios that includes fixed and/or mobile radios, wherein the set of radios relied upon to determine the location of a mobile communication device can vary over time depending on transmission conditions and the location of the mobile communication device. Any combination of fixed or mobile radios of known positions can be used as the reference radios for another mobile radio in the system, thereby providing adaptability under varying conditions.

The ranging and position location technique of the present invention is useful in wide variety of applications, including location and/or tracking of people and items such as: military personnel and equipment, emergency personnel and equipment, valuable items, vehicles, mobile telephones, children and prisoners.

The above and still further objects, features and advantages of the present invention will become apparent upon consideration of the following detailed description of a specific embodiment thereof, particularly when taken in conjunction with the accompanying drawings wherein like reference numerals in the various figures are utilized to designate like components.

DETAILED DESCRIPTION OF THE PREFERRED EMBODIMENTS

In accordance with the present invention, a handheld or portable, spread spectrum communication device provides accurate, reliable position location information within milliseconds without interruption of voice or data communications. Using spread spectrum waveforms and processing techniques, the system of the present invention is capable of determining position location to an accuracy of less than one meter in a severe multipath environment. In particular, a two-way time-of-arrival messaging scheme is employed to achieve the aforementioned objectives, while eliminating the need for highly accurate system clocks required in conventional time-synchronized systems. By performing internal delay calibration, frequency diversity and leading-edge-of-the-signal curve fitting, a highly accurate estimate of ranging signal time of arrival can be obtained, ensuring the accuracy of the range and position calculations based thereon. Unlike conventional systems which require communication with a certain set of fixed-location reference radios, the system of the present invention can use a set of reference radios that includes fixed and/or mobile radios, wherein the set of radios relied upon to determine the location of a mobile communication device can vary over time depending on transmission conditions and the location of the mobile communication device.

Figure 1:
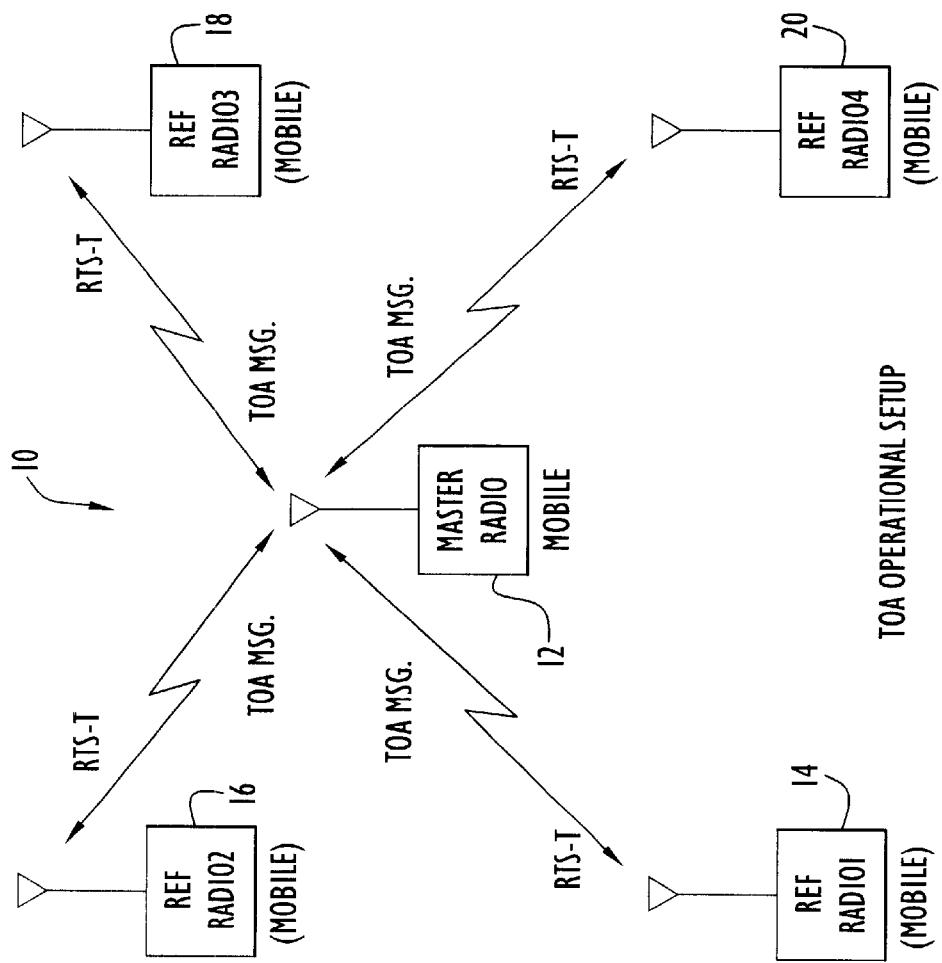
FIG. 1 is a diagrammatic view of the operational setup of the position location system according to the present invention.

Referring to FIG. 1, a position location system 10 includes a target or "master" mobile communication device or "radio" 12 communicating with four reference communication devices 14, 16, 18 and 20. As used herein and in the claims, a mobile communication device or mobile radio is any portable device capable of transmitting and/or receiving communication signals, including but not limited to: a handheld or body-mounted radio; any type of mobile telephone (e.g., analog cellular, digital cellular or satellite-based); a pager or beeper device; a radio carried on, built into or embedded in a ground-based or airborne vehicle; or any portable electronic device equipped with wireless transmission and reception capabilities.

Each of reference radios 14, 16, 18 and 20 can be any radio located at a known position that is capable of communicating with the master radio 12 in the manner described herein to convey position and range-related information. For example, one or more of the reference radios can be a beacon-like radio fixedly mounted in a known location, such as on a tower or building. One or more of the reference radios can also be a mobile radio capable of determining its position from others sources, such as from reception of global position system (GPS) signals or from being presently located at a surveyed position whose coordinates are known and entered into the radio (the reference radios are not themselves GPS satellites). Finally, as explain in greater detail hereinbelow, one or more of the reference radios relied upon by a particular target radio can be another mobile communication device similar or identical to the master radio, wherein the reference radio determines its own position in accordance with the technique of the present invention (in this case, the "reference" radio functions as both a reference radio for other radios and as its own "master" radio). The fact that each reference radio could potentially be a mobile radio is indicated in FIG. 1 by the designation "(MOBILE)" next to each of reference radios 14, 16, 18 and 20.

Master radio 12 communicates with the four reference radios 14, 16, 18 and 20 to determine its location in three dimensions. Specifically, master radio 12 and each of reference radios 14, 16, 18 and 20 includes an antenna coupled to a transmitter and a receiver for transmitting and receiving ranging messages. The antenna, transmitter and receiver of each radio may also be used for other communications, such as voice and data messages. The time of arrival (TOA) of ranging messages transmitted between the master and reference radios is used to determine the range to each reference radio, and trilateration is then used to determine from the range measurements the location of the master radio with respect to the reference radios. Each reference radio must know its own position and convey this information to the master radio to enable the master radio to determine its position from the ranging messages exchanged with the reference radios.

Importantly, the system of the present invention employs a two-way or round-trip ranging message scheme, rather than a one-way TOA scheme, such as those conventionally used to estimate range. As seen from the bi-directional arrows in FIG. 1, master radio 12 transmits to each of the reference radios 14, 16, 18 and 20 an initial outbound ranging message and receives back from each reference radio a reply ranging message. For example, master radio 12 sequentially exchanges ranging message with each individual reference radio, first exchanging ranging messages with reference radio 14, then with reference radio 16, etc.

Figure 2:
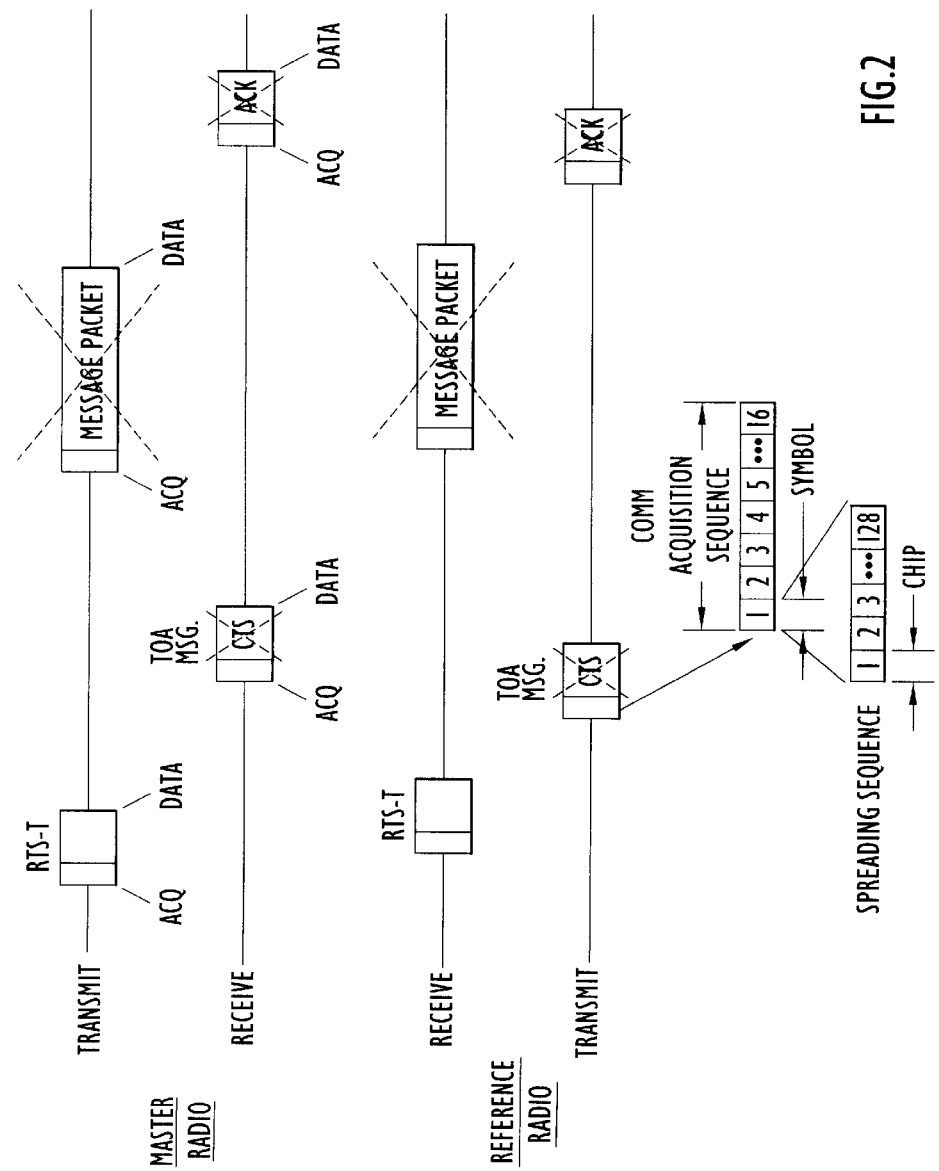
FIG. 2 is a message timing diagram illustrating a modified CSMA-CA protocol useful for exchanging ranging messages in accordance with an exemplary embodiment of the present invention.

By way of non-limiting example, to take advantage of existing hardware and software found in certain radios, the messaging protocol used for ranging can be derived from the Carrier Sense Multiple Access—Collision Avoidance (CSMA-CA) protocol used by these radios. As shown in FIG. 2, the Request-to-Send (RTS) and Clear-to-Send (CTS) messages of the CSMA-CA protocol are retained to provide an initial outbound ranging message and a reply ranging message, respectively, and the Message and Acknowledgement packets of the CSMA-CA protocol need not be used. The RTS message can be adapted for use as the initial outbound ranging message transmitted from the master radio to the reference radios (designated as RTS-T in the figures), and the CTS message can be adapted for use as the reply ranging message transmitted from each of the reference radios to the master radio (designated as TOA Msg. in the figures). The format of the standard RTS and CTS messages can be modified to support the ranging messaging scheme of the present invention, as explained in greater detail hereinbelow. As with standard RTS and CTS messages, the ranging messages of the present invention can be interleaved with voice and data communication messages to permit exchange of the ranging messages without disrupting voice and data communications. Of course, it will be understood that the messaging scheme of the present invention is not limited to any particular protocol, and any suitable message structure that permits transmission of an outbound ranging message and a reply ranging message can be used to implement the present invention.

Referring again to FIG. 2, the ranging message sequence begins with the master radio transmitting an initial outbound ranging message RTS-T to a particular reference radio (the process is repeated with each reference radio in sequence). The reference radio receives the RTS-T message after a delay proportional to the range from the master radio, and determines the time of arrival of the RTS-T message. Subsequently, the reference radio transmits a reply ranging message (TOA Msg.) to the master radio. The TOA message packet indicates the turn around time at the reference radio, i.e., the time between arrival of the RTS-T message and transmission of the corresponding TOA message. The master radio determines the time of arrival of the TOA message and derives the range to the reference radio from knowledge of the round trip delay time and the turn around time.

Figure 3:
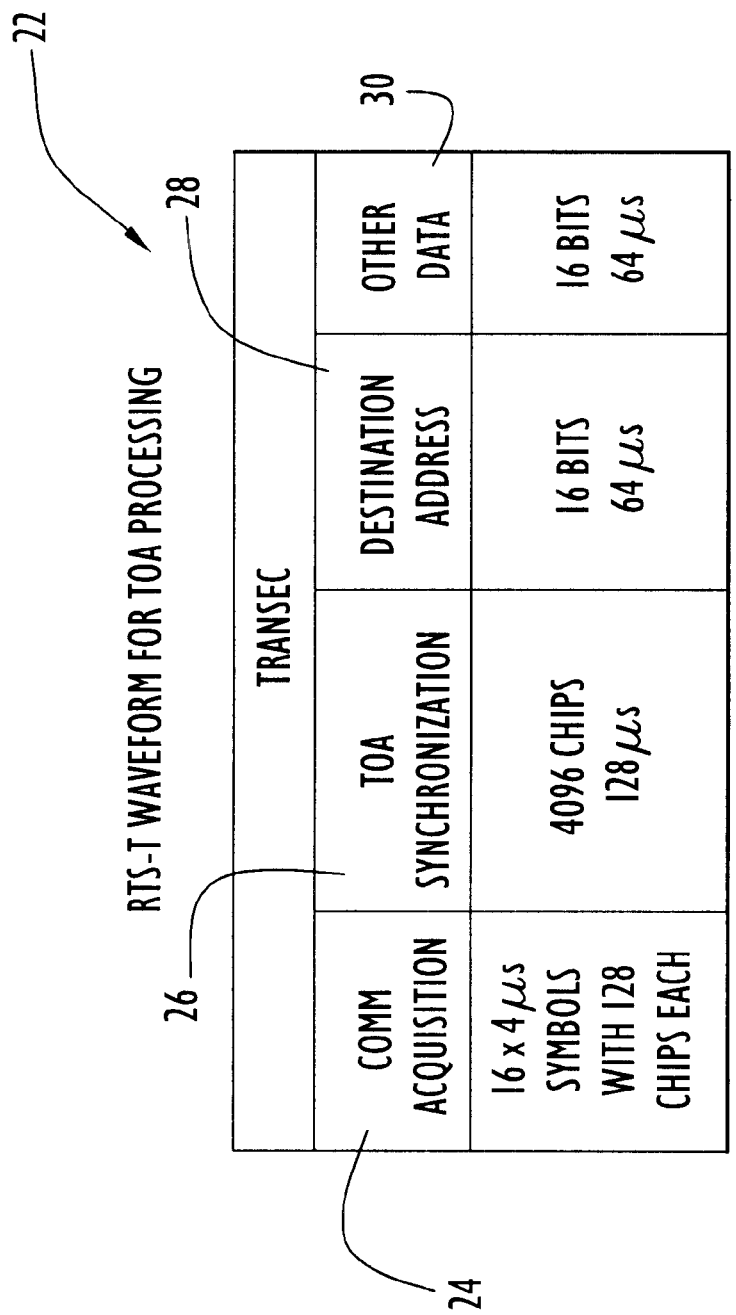
FIG. 3 illustrates the structure of an initial outbound ranging message transmitted by the master radio in accordance with an exemplary embodiment of the present invention.

An example of an RTS-T waveform 22 adapted for accurately determining the time of arrival of the RTS-T message is shown in FIG. 3. The waveform comprises an acquisition portion followed by a data portion. The acquisition portion of the waveform begins with a communication acquisition sequence (comm. acquisition) 24 comprising sixteen 4 $\mu$s symbols with 128 chips each. The communication acquisition sequence is the same as the communication acquisition sequence in a conventional RTS waveform of the CSMA-CA protocol. Consequently, existing hardware and software in the receiver of the reference radios of the exemplary embodiment can be used to detect the arrival of the RTS-T message. The acquisition portion of the RTS-T message also includes a time of arrival (TOA) synchronization sequence 26 comprising 4096 chips (128 $\mu$s in duration). As explained in greater detail hereinbelow, the TOA synchronization sequence is used in conjunction with the communication acquisition sequence to accurately determine the time of arrival.

The data portion of the RTS-T message includes a Destination Address 28 (16 bits, 64 $\mu$s) and Other Data (16 bits, 64 $\mu$s). The Destination Address field is used to indicate the reference radio to which the master radio is directing the RTS-T message. The other data field can include information such as the identification of the master radio, a flag or data indicating a ranging mode, or information relating to the state of multipath interference.

The reply ranging message (TOA Msg.) transmitted from each reference radio to the master radio also contains an acquisition portion with a communication acquisition sequence and a TOA acquisition sequence. In the data portion of the TOA message, the reference radio identifies the destination master radio and may also identify itself as the message source. The TOA message further contains an estimate of the far-end turn around time, which is the duration of time between the time of arrival of the RTS-T message at the reference radio and the time of transmission of the TOA message from the reference radio. The TOA message also contains message information indicating the present location of the reference radio. This information can be known from the fact that the reference radio is in a location whose coordinates are known, from GPS signals received and processed by the reference radio, or by employing the technique of the present invention by ranging from beacon-like radios or other mobile radios.

By precisely knowing the time of transmission of the outbound ranging message, the far-end turn around time at the reference radio (supplied to the master radio in the reply ranging message), the time of arrival of the reply ranging message, and internal transmission/reception processing delays, the master radio can precisely determine the two-way signal propagation time between itself and each reference radio. More specifically, the two-way or round-trip propagation time ($T_{RT}$) is the time of arrival (TOA) of the reply message minus the time of transmission (TT) of the outbound message minus the duration of the turn around time ($\Delta T_{TA}$) and internal processing delays within the master radio $\Delta T_{ID}$ (the internal processing delays of the reference radio are incorporated into the turn around time $\Delta T_{TA}$).

$$T_{RT} = TOA - TT - \Delta T_{TA} - \Delta T_{ID} \tag{1}$$

Although separately represented in equation (1), the accounting for the internal processing delays can be considered part of accurately determining the time of arrival TOA and the time of transmission TT; thus, the round-trip signal propagation time $T_{RT}$ can more generally be described as the difference between a) the elapsed time between the time of transmission of the outbound ranging message and the time of arrival of the reply ranging message and b) the turn around time $\Delta T_{TA}$.

Once the two-way signal propagation time is determined, the range is then readily calculated as the velocity of the signal through the propagating medium (e.g., the speed of light through air) multiplied by the one-way propagation time.

$$\text{Range} = (\text{Velocity})(T_{RT})/2 \tag{2}$$

Note that the time of transmission of the outbound ranging message (TT) is known by the master radio in its own time reference frame. Likewise, the time of arrival (TOA) of the reply ranging message is known by the master radio in its own time reference frame. The turn around time ($\Delta T_{TA}$) is an absolute time duration, unrelated to a particular timing reference of any local clock. That is, the turn around time is determined by the reference radio as the difference between the time of transmission of the reply message transmitted by the reference radio and the time of arrival of the outbound ranging message at the reference radio. While the time of arrival and time of transmission at the reference radio are determined in the time reference frame of the reference radio's local clock, the resulting time difference ($\Delta T_{TA}$) is independent of the reference time frame of the reference radio. Thus, the round trip propagation time ($T_{RT}$) can be determined by the master radio in its own timing reference kept by its local clock without reference to or synchronization with the timing reference of any of the clocks of the reference radios (i.e., system synchronization is not required). In effect, the master radio "starts a timer" when the outbound ranging message is transmitted, "stops the timer" when the reply ranging message arrives, and then subtracts the turn around time and internal processing delays from the "timer's elapsed time" to obtain the duration of the round-trip signal propagation.

The two-way or round-trip messaging approach eliminates the need to synchronize the local clocks of the master radio and the reference radios to the same timing reference. Consequently, the local clocks can have a relatively low accuracy, thereby reducing system complexity and cost. That is, conventional systems that maintain synchronization of the local clocks need highly accurate clocks (e.g., 0.03 ppm) and periodic synchronization processing to prevent the clocks from drifting relative to each other over time. In contrast, the clocks of the present invention can be accurate, for example, to approximately 1 ppm. As used herein, the term "low accuracy clock(s)" refers to a clock having a low accuracy relative to the accuracy of present state-of-the-art clocks used in time-synchronized systems, specifically, an accuracy in the range between approximately 0.5 ppm and 10 ppm. While the clocks of the present invention will experience significant drift over time, this drifting does not impact system performance, because the system does not rely on synchronization of the clocks. More specifically, system of the present invention looks at the round trip delay time of signals between the master and reference radios. Even with relatively low accuracy clocks, the instantaneous or short-term drift or variation experienced by the local clock of the master radio during the brief round trip delay time, and by the local clocks of the reference radios during the even briefer turn around times, are insignificant.

As will be appreciated from the foregoing, the radios of the present invention must be able to accurately determine the time of transmission and the time of arrival of the ranging messages in order to accurately measure the range between the radios and to accurately estimate the position of the master radio. The present invention includes a number of techniques for accurately determining the true time of arrival and time of transmission, even in the presence of severe multipath interference which conventionally tends to degrade the accuracy of the time of arrival estimate.

As previously explained, asynchronous events occur within each radio which cannot readily be characterized or predicted in advance. These events introduce errors in the radio with respect to knowledge of the actual time of transmission and time of arrival, thereby degrading the accuracy of the range and position estimates. In other words, the time it takes for a signal to be processed within each radio is not constant over time, and to assume that the processing delay has a fixed value introduces inaccuracy in the time of arrival and time of transmission estimates.

According to the present invention, to minimize processing delay timing errors resulting from asynchronous events that occur within the signal processors of the radios, each radio performs an internal delay calibration in close time proximity to the transmission time of the ranging messages in order to accurately estimate the actual internal processor time delays that occur when processing the ranging messages.

Figure 4:
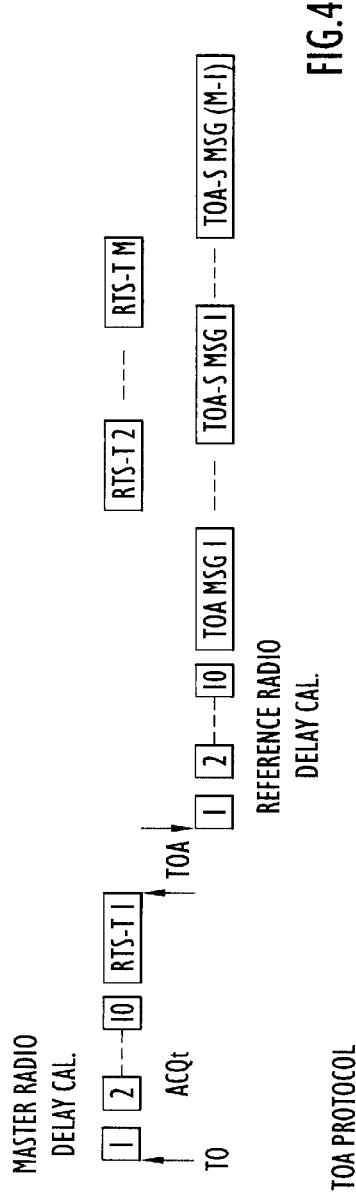
FIG. 4 illustrates the timing of the internal delay calibration performed by the master radio and reference radios during the ranging message sequence in accordance with an exemplary embodiment of the present invention.
Figure 5:
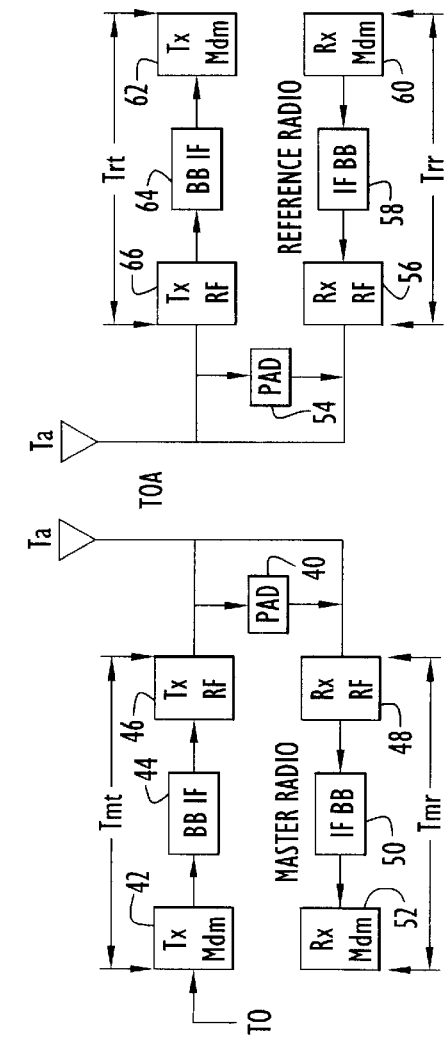
FIG. 5 is a functional block diagram illustrating the internal delay calibration processing performed by the master radio and the reference radios in accordance with an exemplary embodiment of the present invention.

Referring to FIGS. 4 and 5, the master radio initiates the TOA ranging process by performing an internal delay calibration using a loop back through pad 40 to determine internal delays (Tmt+Tmr) in the master radio for correction purposes. Multiple trials, for example ten, are performed and averaged to reduce the variance of the delay estimate. The delay Tmt is the master radio transmitter delay. It is the sum of the delays through the transmit modem (Tx mdm) 42 where the transmit signal is implemented, the transmit baseband to intermediate frequency (BB-IF) conversion 44, and the transmit radio frequency (Tx RF) analog circuitry 46 of the master radio. The delay Tmr is the master radio receiver delay. It is the sum of the delays through the receive radio frequency (Rx RF) analog circuitry 48 of the master radio, the IF-BB conversion 50, and the receive modem (Rx mdm) 52 where demodulation processing occurs.

Once the delay calibration is completed, the master radio begins the TOA ranging message sequence by transmitting the RTS-T outbound ranging message to the reference radio with, for example, a bit set in the TOA data field indicating the TOA ranging mode. The reference radio receives the RTS-T, reads the TOA data bit, performs an internal delay calibration using a loop back through pad 54 to determine the reference radio internal delay (Trt+Trr), curve fits to refine the turnaround delay (as described below), and forms the TOA Message. The TOA Message includes data indicating the location of the reference radio (e.g., GPS location data), results of the delay calibration, and turnaround delay refinement from curve fitting. The delay Trr is the reference radio receiver delay. It is the sum of the delays through the Rx RF analog circuitry 56 of the radio, the IF-BB conversion 58, and the Rx modem 60 where demodulation processing occurs. The delay Trt is the reference radio transmitter delay. It is the sum of the delays through the Tx modem 62, the transmit BB-IF conversion 64, and the Tx RF analog circuitry 66 of the reference radio. The TOA Message is transmitted back to the master radio which computes the final one-way TOA, range, and relative position.

The value for the master and reference radio antenna delay Ta (see FIG. 4) is a constant preloaded into the radios and combined with the results of delay calibration to reference the TOA to the antenna/air interface. The delay Ta is determined by measuring the delay through a large sample of antennas and cabling, over a range of operating temperatures, and calculating the mean and standard deviation of the measured values. Note that cabling delays for cabling between antenna and electronics are included in Ta.

Thus, the internal processing delay of the master radio $\Delta T_{ID}$ seen in equation (1) is determined from the master radio transmitter and receiver delays Tmt and Tmr determined from the calibration process and the estimated antenna delay Ta. Similarly, the estimate of the duration of the turn around time TT includes the reference radio transmitter and receiver delays Trt and Trr determined from the calibration process and the estimated antenna delay Ta. The total elapsed time measured by the master radio between transmission of the outbound ranging message and reception the reply ranging message includes time attributable to propagation of the message signals and time attributable to processing delays within the radios. By accurately estimating and subtracting out the time attributable to processing delays, the signal propagation time (and hence the range) can be more accurately determined.

The internal delay calibration performed in the radios of the present invention is one of the keys to getting repeatable accuracy with low resolution clocks. In essence, by sending calibration signals through the same processing used to subsequently transmit the actual ranging message, the difficult-to-characterize processing delay variations can be calibrated out to yield a more accurate measurement. As shown in FIG. 4, the master radio calibration process can be performed just prior to starting the timer measuring the duration of the round trip message time, and the reference radio calibration can be performed during the turn around time at the reference radio. More generally, the calibration in the radios can be performed at any point in time that is briefly before transmission of the ranging signals (e.g., within milliseconds). For example, if subsequent ranging messages are exchanged between the master and reference radio immediately after the initial exchange, calibration does not need to be repeated for these subsequent messages (see FIG. 4).

Another aspect to accurately determining the range between the master radio and the reference radios is the precise estimation of the time of arrival of the outbound ranging message at the reference radio and the time of arrival of the reply ranging message at the master radio. In accordance with another aspect of the present invention, the timing of the leading edge of a synchronization sequence of the ranging message is accurately determined by assessing and avoiding multipath interference which can degrade the accuracy of the time of arrival estimate. In particular, a two-stage signal acquisition scheme is employed using the communication acquisition sequence and the TOA synchronization sequence of the RTS-T and TOA messages. Detection of the communication acquisition sequence is used to trigger acquisition of the TOA synchronization sequence in which the time of arrival is precisely estimated.

Figure 6:
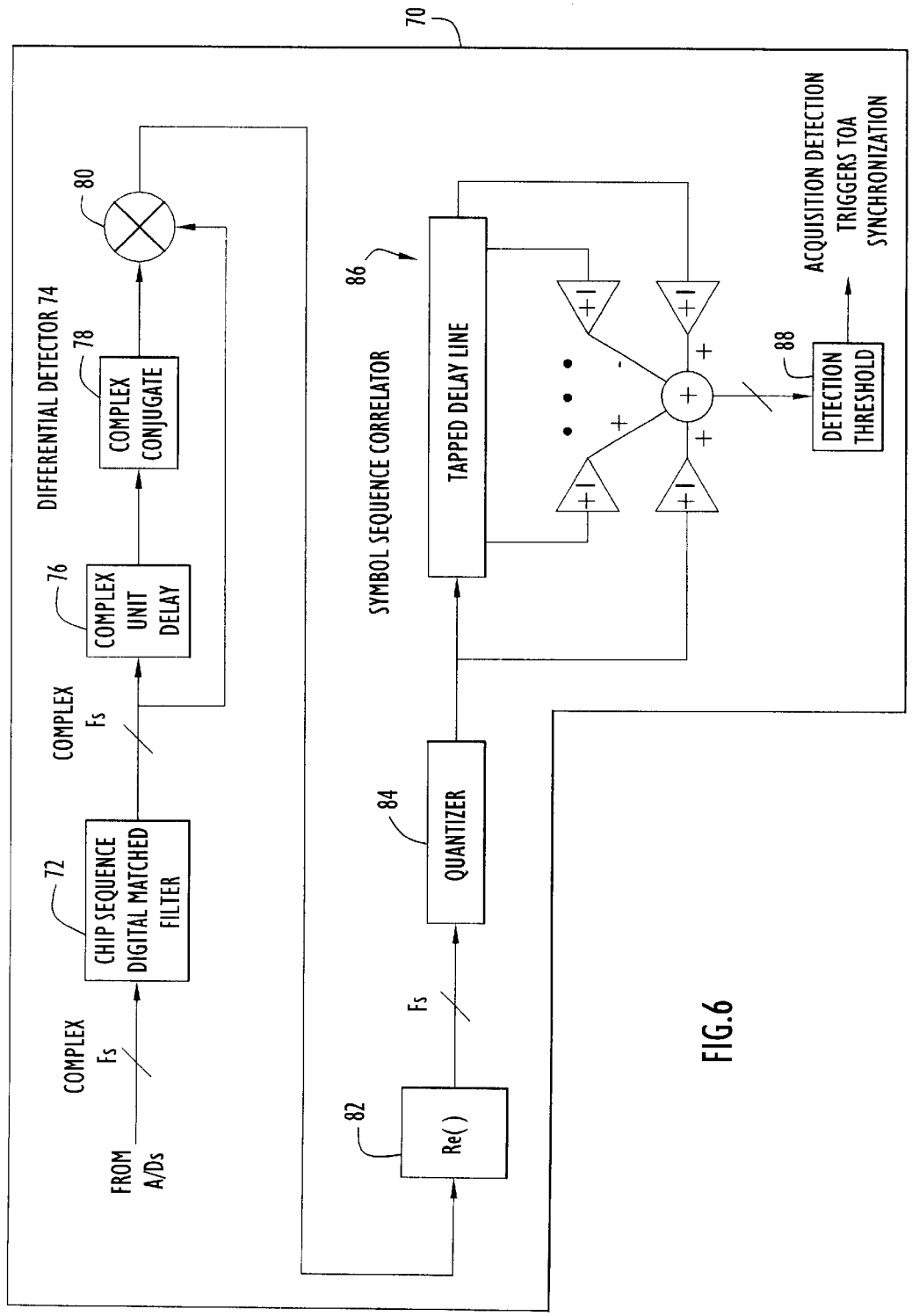
FIG. 6 is a functional block diagram illustrating the acquisition processing employed to detect the communication acquisition sequence of the ranging messages in accordance with an exemplary embodiment of the present invention.

A functional block diagram illustrating acquisition of the communication acquisition sequence of the spread spectrum RTS-T message at each reference radio (and acquisition of the TOA messages at the master radio) is shown in FIG. 6. After analog-to-digital (A/D) conversion, the communication acquisition sequence in the form of a spread spectrum complex signal is processed to provide time synchronization for the modem of the reference radio. Specifically, the acquisition detection processing employs digital matched filtering and Barker code correlation to detect the transmitted communication acquisition waveform and to derive the required timing information. By way of example, the communication acquisition processor 70 can be configured to meet the following operational requirements: probability of detection=99.5%, probability of false alarm =$10^{-6}$, and time of detection determined to ¼ of a chip.

The communication acquisition processor 70 includes digital matched filter (DMF) 72 (N=128) having coefficients that are matched to the length 128 PN sequence that is chipping each of the sixteen, 4 $\mu$sec comm. acquisition symbols. The DMF 72 de-spreads each of the symbols and provides a peak response when aligned with each symbol. The PN sequence can be identical for each of the sixteen segments. The DMF 72 can be clocked, for example, at 32 MHz, thereby yielding 128 coefficients for the inphase (I) filter section and 128 coefficients for the quadrature (Q) filter section. The DMF coefficients can be programmable.

A differential detector 74 compares the phase of the received signal between two successive symbol intervals. More specifically, differential detector 74 includes a complex delay unit 76 which delays the output of DMF 72 by a symbol interval, a complex conjugate unit 78 which forms the complex conjugate of the delayed signal, and a comparator 80 which receives the output of DMF 72 and the delayed complex conjugate of the output of DMF 72 and produces the differential detector output. The decision variable is proportional to the phase difference between these two complex numbers, which, for BPSK, can be extracted from the real part of the differential detector output (see block 82).

The real portion of the differential detector output is quantized in quantizer 84 and supplied to a symbol sequence correlator 86, such as a Barker code correlator. The output of the Barker code correlator is compared to a detection threshold 88. If the detection threshold is exceeded, a communication detection is declared.

This first stage of the two-stage signal acquisition processing (i.e., detection of the communication acquisition sequence) is the same as the processing used to detect the communication acquisition sequence of the conventional RTS message in the CSMA-CA protocol, thereby allowing existing hardware and software to be used. The communication acquisition processor 70 treats the communication acquisition sequence as a sequence of 16, 128 chip symbols and therefore employs a relatively short matched filter (N=128), resulting in a modest amount of processing. This modest processing load is desirable, since the receiver must continuously perform this processing to detect the communication acquisition sequence (whose arrival time is not known apriori).

While the detection result of the communication acquisition process can be used to estimate the TOA of the ranging message (i.e., a one-stage TOA estimation process), a more accurate estimate can be obtained by processing a longer symbol with a longer matched filter. However, continuously running a longer matched filter would require excessive processing. Accordingly, the system of present invention employs a two-stage process, wherein detection of the communication acquisition sequence triggers a second stage in which a longer acquisition symbol is processed with a longer matched filter (i.e., TOA synchronization processing). This additional processing is required only over a limited period of time identified by detection of the communication acquisition sequence, thereby preventing excessive processing.

Figure 7:
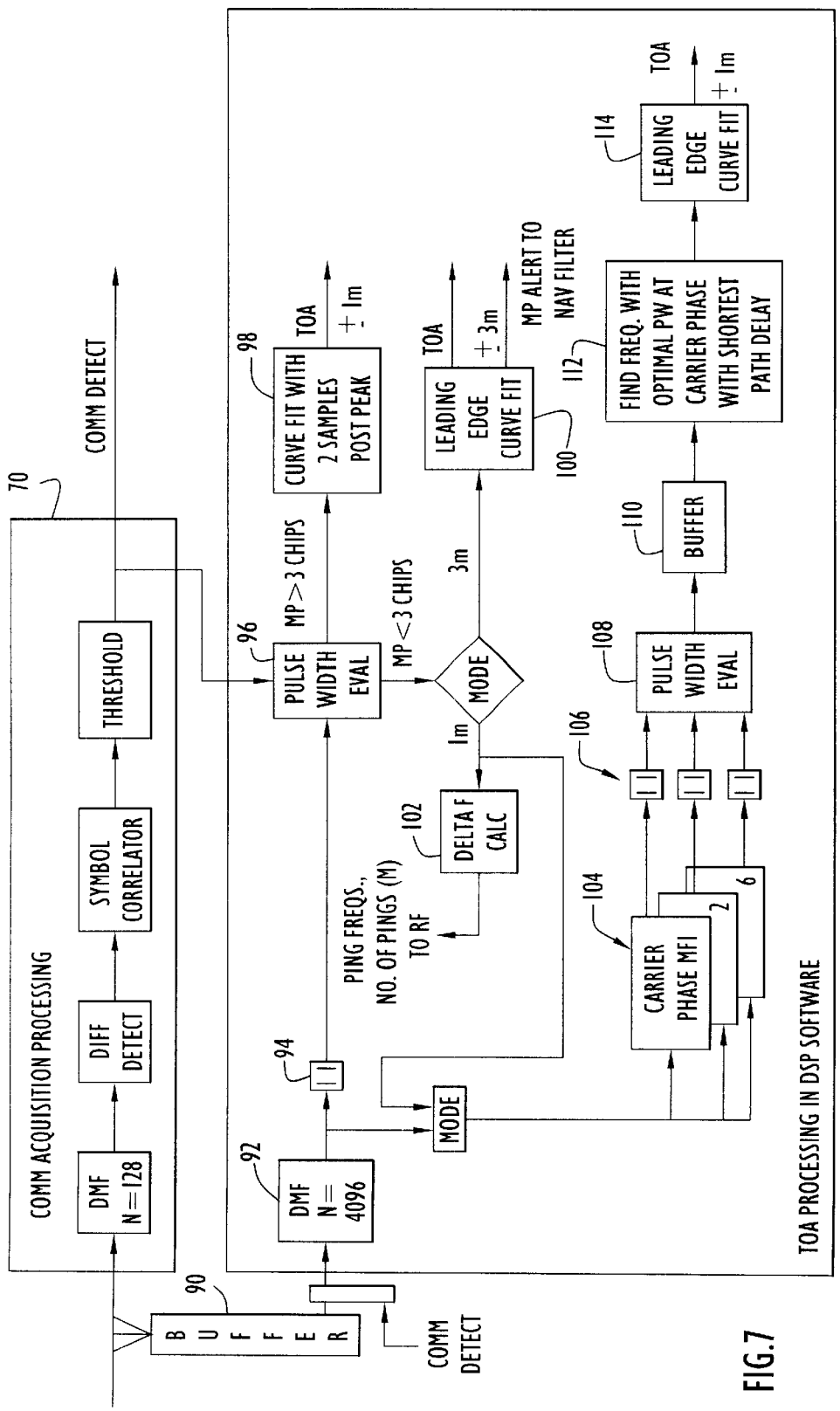
FIG. 7 is a functional block diagram illustrating the processing performed to determine the time of arrival of a ranging message, involving evaluation and separation of multipath interference from the direct path signal.

The TOA estimation algorithm in accordance with an exemplary embodiment of the present invention is shown in FIG. 7. Note that TOA processing occurs in both the reference radio upon reception of the outbound RTS-T ranging message and in the master radio upon reception of the reply TOA ranging message. During detection processing of the communication acquisition sequence of the ranging message (block 70), the TOA synchronization sequence is buffered in buffer 90. Detection of the communication acquisition sequence triggers the TOA processor 92 to process the buffered TOA synchronization sequence. Matched filtering is performed on the 4096 chip TOA synchronization sequence using a digital matched filter (N=4096). After performing a magnitude function (block 94), the filtered TOA synchronization sequence is applied to a pulse width evaluator 96 which determines the severity of the multipath interference between the master radio and the reference radio at the frequency of the ranging message. Essentially, a replica of the TOA synchronization sequence's multipath-free correlation function out of the matched filter is stored in the pulse width evaluator 96 (i.e., the multipath-free pulse shape profile is known). Pulse width evaluator 96 moves the pulse shape replica through the profile of the output of the matched filter 92 and performs a least-mean-square error fit to achieve a rough curve fitting between the replica pulse shape and the matched filter output to identify the timing of the direct path signal and subsequent multipath signals (at the time of the direct path signal and the multipath signal, the matched filter profile will be similar to the replica profile). In this manner, the pulse width evaluator 96 can determine the separation, in terms of chips, between the direct path signal and the closest substantial multipath interference signal.

The TOA processor can be configured to provide one or more levels of TOA accuracy. In the embodiment shown in FIG. 7, the TOA processor is capable of providing two selectable levels of accuracy; a one meter accuracy and a three meter accuracy (the accuracy refers to the resultant range estimate). The desired accuracy mode can be set by the master radio or by a system controller and can be conveyed to the reference radio in the initial RTS-T message or another preceding message.

If the pulse width evaluator determines that the multipath interference is separated from the direct path signal by more than a predetermined number of chip widths, the multipath interference is classified as insubstantial in terms of impacting the TOA estimate. In the exemplary embodiment shown in FIG. 7, if the multipath interference is separated from the direct path signal by more than three chip widths, the multipath interference is considered to be insubstantial. Optionally, more than one chip width threshold can be used to provide a more refined estimate of the severity of multipath interference.

When the multipath interference is judged by the pulse width evaluator 96 to be insubstantial, the TOA estimate is obtained via a curve fitting algorithm using the leading edge samples plus two samples after the peak. Post peak samples can be used because the multipath will not corrupt them in this case. A high accuracy TOA measurement (e.g., one meter accuracy) is attained in this case, regardless of the selected accuracy mode.

The resulting TOA measurement is processed in the aforementioned manner to accurately determine the range between the master radio and the reference radio (i.e., at the reference radio the TOA estimate is used to accurately determine the turn around time, and at the master radio, the TOA estimate is used to accurately determine the round trip propagation time). The resulting range estimate, together with the TOA accuracy estimate (e.g., one meter or three meters) is supplied to a navigation Kalman filter (not shown) which tracks the location solution of the master radio.

In accordance with the exemplary embodiment shown in FIG. 7, if the pulse width evaluator 96 determines that the separation between the direct path signal and the nearest multipath signal is less than a predetermined number of chip widths (e.g., three), the multipath interference is classified as substantial. In this case, the processing differs, depending on whether a high accuracy (e.g., one meter) TOA mode or a lower accuracy (e.g., three meter) TOA mode has been selected. If a lower accuracy (e.g., three meters) mode has been selected, a leading edge curve fit 100 is implemented to estimate the TOA. Note that, in this case, post peak samples are not used, since multipath interference would likely corrupt these samples. In addition to reporting the lower accuracy of the TOA estimate to the Kalman filter, a multipath alert is passed on to the Kalman filter to reduce the associated filter gain.

On the other hand, if the multipath interference is classified as substantial and the high accuracy (e.g., one meter) mode has been selected, the TOA processor implements a process employing frequency diversity to identify an optimal transmission frequency that minimizes multipath interference. Note that the capability to declare that frequency diversity processing is to be carried out can reside in one or both of the reference radio (upon processing the outbound RTS-T ranging message) and the master radio (upon processing the reply TOA ranging message).

Taking the case where the master radio is configured to declare the need for frequency diversity, the master radio identifies the set of M carrier frequencies that will be used to transmit a sequence of M outbound ranging messages and M corresponding reply ranging messages (block 102). If the reference radio is configured to declare the need for frequency diversity processing, it can notify the master radio in the reply TOA ranging message of the need to initiate this process. These frequencies are referred to as "ping" frequencies, since a rapid succession of M different frequency signals or multiple "pings" are transmitted between the radios in search of an optimal frequency. Using the pulse width information, the number of pings and the ping frequencies are determined and the control information is transferred to the RF subsystem of the master radio. Diverse frequencies create diverse carrier phases in multipath. Ranging performance is best when the carrier phase of the multipath is 90° with respect to the direct path. If this orthogonality condition is met, the direct path and multipath are separated such that the direct path can be more precisely curve fit with minimal effects for multipath.

The selection of the number M of ping frequencies and the individual ping carrier frequencies can be determined in any of number of ways. For example, a fixed number of carrier frequencies (e.g., M=8, including the first frequency already transmitted) at set frequencies covering a predetermined frequency range can be used (e.g., carrier frequencies at 2 MHz increments covering a 15 MHz range). Alternatively, the number of trials/frequencies can be selected from 1 to M depending on the severity of the multipath. More generally, ping frequencies can be calculated or predetermined to effectively rotate the inphase and quadrature samples at the output of the DMF through the carrier phase in 15° increments (or other increments) to find the frequency that best orthogonalizes the phase of the multipath interference with respect to the direct path signal.

Once the number M of ranging message exchanges and ping frequencies are determined or selected, the next M-1 TRS-T/TOA message exchanges are transmitted, using different carrier frequencies for each exchange. These subsequent M-1 RTS/TOA message exchanges can use shortened packets that include the acquisition portion and radio identification numbers (designated with an "S" suffix on the TOA messages in FIG. 4). Delay calibrations and GPS data are not required due to the rapid rate at which these packets are exchanged.

Referring again to FIG. 7, the TOA processor processes the communication acquisition sequence and the TOA synchronization sequence of each of the M ranging messages in the same manner as the initial ranging message. Specifically, upon detection of the communication acquisition sequence, the TOA synchronization sequence is match filtered (taking into consideration the carrier frequency), the magnitude is determined, and the resulting signal is evaluated by a pulse width evaluator to determine the proximity of the multipath interference to the direct path signal (see blocks 104, 106 and 108). The results of the pulse width evaluation from each of the M ranging messages and the output of the matched filter are stored in a buffer 110. Upon completion of the M trials, the frequency having the best multipath discrimination is identified (block 112) and a leading edge curve fit 114 is performed on the output of the corresponding matched filter to estimate the TOA. Specifically, the data is searched to find the frequency where the optimal pulsewidth occurs at the carrier phase with the shortest path delay. The resulting TOA measurement is processed in the aforementioned manner to accurately determine the range between the master radio and the reference radio, and the range estimate and TOA accuracy estimate are supplied to the navigation Kalman filter to update the master radio's position.

Note that the TOA synchronization sequence is not strictly required by the system of the present invention; the receiver can directly use the communication acquisition sequence to evaluate multipath interference and curve fit to determine the leading edge of the signal. For example, the communication acquisition sequence can be continuously buffered and, upon detection, a longer matched filter (N=2048) treating the communication acquisition sequence as one long symbol can be used to perform the TOA estimation. In this case, the relatively rough estimate of the TOA provided by the communication acquisition processing can be used to limit the time range over which the TOA processor match filters the communication acquisition sequence with the 2048 length matched filter. The TOA processing is otherwise similar to the TOA processing shown in FIG. 7 (the DMF would be 2048 chips long rather than 4096). However, a more precise estimate can be obtained using the TOA synchronization sequence described above, since the 4096 chip TOA synchronization sequence yields superior signal properties, such as lower sidelobes.

While a particular implementation of the TOA processing has been described in conjunction with FIG. 7, it will be understood that other implementation and variations in the TOA processing scheme fall within the scope of the invention. For example, if a high accuracy TOA mode is selected, the radios can automatically exchange ranging messages at M different frequencies without first evaluating at a first frequency whether multipath interference is substantial (as is required in the above-described algorithm), and a single ranging message exchange can always be used in the lower accuracy TOA mode. While automatically requiring transmission of multiple round-trip ranging messages in the high accuracy mode, this approach could potentially provide a simpler messaging implementation, since there are no contingencies for determining whether or not to transmit additional ranging messages after the first message exchange.

The master radio determines its own position from the measured range to each of the reference radios via a trilateration technique which can be for example, a conventional trilateration technique. Once the master radio's position has been determined, the master radio can convey this information to other radios or to a controller or coordinator performing tracking and/or mapping of the master radio and perhaps other associated mobile radios. The ranging/position location processing can be performed periodically or initiated by the master radio or a system controller as needed.

As will be understood from the above description, the mobile communication device allows the position location system of the present invention to be self-healing. That is, in situations with a number of mobile radios, each mobile radio may be able to serve as both a master radio to determine its own position and as a reference radio for other mobile radios. Thus, when a particular mobile radio cannot receive adequate ranging signals from a current set of reference radios, the mobile radio can alter the set of reference radios to include mobile radios whose ranging signals are acceptable. For example, a first mobile radio may be relying on four reference radios that are fixed or GPS-based. A second mobile radio may be positioned such that the signal strength from one of the fixed or GPS-based reference radios is too weak or the positional geometry is such that the four fixed/GPS-based reference radios do not provide accurate three-dimensional information (e.g., two are along the same line of sight). In this case, the second mobile radio can use the first mobile radio as one of the reference radios if this provides better results. This flexibility is in contrast to conventional systems where the mobile radios must rely on fixed transmitters for reception of ranging signals and cannot range off of other mobile radios to determine position.

While shown in FIG. 1 as communicating with four reference radios, it will be understood that the master radio of the present invention can communicate ranging messages with any plurality of reference radios. For example, the master radio can determine some position information from communication with as few as two reference radios. Further, the master radio can exchange ranging messages with more than four reference radios and dynamically select the best four range measurement each time the position location process is performed, based on signal strength of the TOA messages, geometry, etc. In this way, for example, the master radio can determine and use its four nearest neighbors as the reference radios.

The hardware required to implement the system of the present invention easily fits within the physical footprint of a handheld spread spectrum radio, permitting the system to be used in a wide variety of applications. For example, to provide situation awareness in military exercises, the system of the present invention can be used to determine and track the location of military personnel and/or equipment during coordination of field operations. This would be particularly useful in scenarios where GPS signals are weak or unavailable due to atmospheric conditions, terrain or location of the radio inside a building, or to augment and enhance the accuracy of GPS position information. The position information can be used by a commander to dynamically map the current position of personnel and equipment and to coordinate further movements. Further, individual mobile radios can receive and display position information for other related personnel, so that soldiers in the field are provided with situation awareness for their immediate surroundings.

The system of the present invention can also be used to locate and track non-military personnel and resources located both indoors or outdoors, including but not limited to: police engaged in tactical operations; firefighters located near or within a burning building; medical personnel and equipment in a medical facility or en route to an emergency scene; and personnel involved in search and rescue operations.

The system of the present invention can also be used to track high-value items by tagging items or embedding a mobile radio in items such as personal computers, laptop computers, portable electronic devices, luggage (e.g., for location within an airport), briefcases, valuable inventory, and stolen automobiles.

In urban environments, where conventional position determining systems have more difficulty operating, the system of the present invention could reliably track fleets of commercial or industrial vehicles, including trucks, buses and rental vehicles equipped with mobile radios. Tracking of people carrying a mobile communication device is also desirable in a number of contexts, including, but not limited to: children in a crowded environment such as a mall, amusement park or tourist attraction; location of personnel within a building; and location of prisoners in a detention facility. The mobile radio could be carried on the body by incorporating the radio into clothing, such as a bracelet, a necklace, a pocket or the sole of a shoe.

The system of the present invention also has application in locating the position of cellular telephones. By building into a conventional mobile telephone the ranging and position location capabilities of the present invention, the location of the telephone can be determined when an emergency call is made or at any other useful time. This capability could also be used to assist in cell network management (i.e., in cell handoff decisions).

While the present invention has been described above in the context of a system that transmits and receives electromagnetic signals through the air, it will be appreciated that the two-way round-trip ranging technique, including the internal delay calibration and TOA processing can be used in other mediums and with other types of signals, including, but not limited to: electromagnetic signals transmitted through solid materials, water or in a vacuum; pressure waves or acoustic signals transmitted through any medium (e.g., seismic, sonar or ultrasonic waves).

Having described preferred embodiments of new and improved method and apparatus for determining the position of a mobile communication device using low accuracy clocks, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. A mobile communication device capable of determining range to a reference communication device by exchanging ranging signals with the reference communication device, comprising:

a transmitter configured to transmit to the reference communication device a sequence of outbound ranging signals at different carrier frequencies;

a receiver configured to receive from the reference communication device a sequence of reply ranging signals at the different carrier frequencies in response to the outbound ranging signals; and a processor configured to select from among the reply ranging signals a reply ranging signal at a carrier frequency providing a highest signal timing accuracy, said processor determining a time of arrival of the selected reply ranging signal and the range to the reference communication device from a round-trip signal propagation time of the selected reply ranging signal and a corresponding outbound ranging signal.

2. The mobile communication device of claim 1, wherein said processor selects the reply ranging signal whose carrier frequency minimizes multipath interference.

3. The mobile communication device of claim 1, wherein said processor estimates the time of arrival of the selected reply ranging signal using signal curve fitting and computes the range to the reference communication device using a timing adjustment determined from the signal curve fitting.

4. The mobile communication device of claim 3, wherein:

the reference communication device estimates the time of arrival of the outbound ranging signals using signal curve fitting; and said processor of the mobile communication device computes the range to the reference communication device using a timing adjustment determined from the signal curve fitting performed by the reference communication device on the outbound ranging signal corresponding to the selected reply ranging signal.

5. The mobile communication device of claim 1, wherein said mobile communication device performs internal delay calibration to reduce errors in estimating a time of arrival of the reply ranging signal and computes the range to the reference communication device using a timing delay determined from the internal delay calibration.

6. The mobile communication device of claim 5, wherein:

the reference communication device performs internal delay calibration to reduce errors in estimating a time of arrival of the outbound ranging signals; and said processor of the mobile communication device computes the range to the reference communication device using a timing delay determined from the internal delay calibration performed by the reference communication device.

7. The mobile communication device of claim 1, wherein said mobile communication device determines ranges to a plurality of reference communication devices by exchanging ranging signals with each of the reference communication devices, said processor determining the position of said mobile communication device from known positions of said reference communication devices and the range to each of said reference communication devices.

8. The mobile communication device of claim 1, further comprising:

a low accuracy clock adapted to maintain a local timing reference, said mobile communication device determining a time of transmission of the outbound ranging signals and a time of arrival of the reply ranging signals in accordance with the local timing reference, said low accuracy clock not being synchronized with a clock maintaining a local timing reference for the reference communication device.

9. The mobile communication device of claim 1, wherein said mobile communication device is a handheld device.

10. A mobile communication device capable of determining range to a reference communication device by exchanging ranging signals with the reference communication device, comprising:

means for transmitting to the reference communication device a sequence of outbound ranging signals at different carrier frequencies;

means for receiving from the reference communication device a sequence of reply ranging signals at the different carrier frequencies in response to the outbound ranging signals;

means for selecting from among the reply ranging signals a reply ranging signal at a carrier frequency providing a highest signal timing accuracy; and means for determining a time of arrival of the selected reply ranging signal and the range to the reference communication device from a round-trip signal propagation time of the selected reply ranging signal and a corresponding outbound ranging signal.

11. The mobile communication device of claim 10, wherein said selecting means selects the reply ranging signal whose carrier frequency minimizes multipath interference.

12. The mobile communication device of claim 10, wherein said mobile communication device determines ranges to a plurality of reference communication devices by exchanging ranging signals with each of the reference communication devices, said mobile communication device further comprising:

means for determining the position of said mobile communication device from known positions of said reference communication devices and the range to each of said reference communication devices.

13. A method of determining the range between a mobile communication device and a reference communication device, comprising the steps of:

(a) transmitting a sequence of outbound ranging signals at different carrier frequencies from the mobile communication device to the reference communication device;

(b) transmitting a sequence of reply ranging signals at the different carrier frequencies from the reference communication device to the mobile communication device in response to the outbound ranging signals; and (c) determining the range between the mobile communication device and the reference communication device from a round-trip signal propagation time of a selected outbound ranging signal and a corresponding reply ranging signal transmitted at a carrier frequency providing a highest signal timing accuracy.

14. The method of claim 13, wherein steps (a), (b) and (c) are repeated with the mobile communication device and a plurality of reference communication devices, the method further comprising the step of:

(d) determining the position of the mobile communication device from known positions of the reference communication devices and the range to each reference communication device.

15. The method of claim 13, wherein the selected outbound ranging message and the corresponding reply ranging message are selected to minimizes multipath interference.

16. A position location system for determining the position of a mobile communication device, comprising:

a plurality of reference communication devices having known positions, each configured to transmit and receive ranging signals; and a mobile communication device configured to exchange ranging signals with said reference communication devices, said mobile communication device transmitting to each reference communication device a sequence of outbound ranging signals at different carrier frequencies, each of said reference communication devices transmitting a sequence of reply ranging signals at the different carrier frequencies in response to the outbound ranging signals, wherein;

said mobile communication device determines the range to each reference communication device from a round-trip signal propagation time of a selected outbound ranging signal and a corresponding reply ranging signal transmitted at a carrier frequency providing a highest signal timing accuracy, and determines the position of said mobile communication device from the known positions of said reference communication devices and the range to each reference communication device.

17. The system of claim 16, wherein, for each reference radio, said mobile communication device selects the reply ranging signal whose carrier frequency minimizes multipath interference.

18. The system of claim 16, wherein at least one of said reference communication devices is another mobile communication device.

* * * * *